United States Patent [19]

Yankoff

[11] Patent Number: 4,621,547

[45] Date of Patent: Nov. 11, 1986

[54] METHOD AND APPARATUS FOR MACHINING

[76] Inventor: Gerald K. Yankoff, 8273 Coppernail Way, Westchester, Ohio 45069

[21] Appl. No.: 762,570

[22] Filed: Aug. 5, 1985

Related U.S. Application Data

[63] Continuation-in-part of Ser. No. 580,730, Feb. 23, 1984, abandoned, which is a continuation-in-part of Ser. No. 470,193, Feb. 28, 1983, abandoned, which is a continuation-in-part of Ser. No. 263,305, May 13, 1981, abandoned.

[51] Int. Cl.⁴ .................. B23B 1/00; B23B 27/10; B23B 27/22
[52] U.S. Cl. .................. 82/1 C; 407/11; 408/57; 408/60
[58] Field of Search ............ 82/1 C, 50; 407/11; 408/56, 57, 59, 60, 61; 29/DIG. 64, DIG. 66, DIG. 92

[56] References Cited

U.S. PATENT DOCUMENTS

| 160,161 | 2/1875 | Clay | 407/11 |
|---|---|---|---|
| 354,498 | 12/1886 | Kerchove | 407/11 |
| 522,588 | 7/1894 | Chouteau | 407/11 |
| 1,119,669 | 12/1914 | Wigness | 407/11 |
| 1,296,536 | 3/1919 | Leech . | |
| 1,695,955 | 12/1928 | Frayer | 407/11 |
| 1,940,220 | 12/1933 | McGrath . | |
| 2,188,631 | 1/1940 | Kraus . | |
| 2,237,901 | 4/1941 | Chun . | |
| 2,360,385 | 10/1944 | Anderson . | |
| 2,550,645 | 4/1951 | Retz . | |
| 2,653,517 | 9/1953 | Pigott | 407/11 |
| 2,815,688 | 12/1957 | Forbes et al. . | |
| 2,848,790 | 8/1958 | McMann | 407/11 |
| 2,925,224 | 2/1960 | Cunningham . | |
| 3,002,410 | 10/1961 | Lee | 407/11 |
| 3,037,264 | 6/1962 | Mossberg . | |
| 3,176,330 | 4/1965 | Jennings | 407/11 |
| 3,323,195 | 6/1967 | Vanderjagt | 407/11 |
| 3,364,800 | 1/1968 | Benjamin et al. | 407/11 |
| 3,570,332 | 3/1971 | Beake | 407/11 |
| 3,591,306 | 7/1971 | Kaser . | |
| 3,808,656 | 5/1974 | Lindskog | 407/11 |
| 3,816,018 | 6/1974 | Hlocky . | |
| 4,040,764 | 8/1977 | Baturka | 408/59 |
| 4,047,826 | 9/1977 | Bennett | 408/59 |
| 4,072,438 | 2/1978 | Powers . | |
| 4,115,024 | 9/1978 | Sussmuth . | |
| 4,159,885 | 7/1979 | Schott . | |
| 4,302,135 | 11/1981 | Lillie | 407/11 |
| 4,312,250 | 1/1982 | Yankoff . | |
| 4,318,645 | 3/1982 | McCreery . | |

FOREIGN PATENT DOCUMENTS

| 2843433 | 4/1980 | Fed. Rep. of Germany . | |
|---|---|---|---|
| 3004166 | 8/1980 | Fed. Rep. of Germany . | |
| 1279749 | 11/1961 | France . | |
| 2244590 | 4/1975 | France . | |
| 0218821 | 12/1961 | Netherlands . | |
| 1369096 | 10/1974 | United Kingdom | 407/11 |
| 727329 | 4/1980 | U.S.S.R. | 407/11 |

OTHER PUBLICATIONS

"Hydraulic Chipbreaking", by F. O. Rasch, T-Vigeland, submitted by O. Bjorke, Production Engineering Laboratory NTH–SINTEE.

Primary Examiner—Francis S. Husar
Assistant Examiner—Jerry Kearns
Attorney, Agent, or Firm—Wood, Herron & Evans

[57] ABSTRACT

A method and apparatus for machining a workpiece such with an insert having a surface terminating with a cutting edge includes a tool holder adapted to mount the insert, which is formed with coolant delivery passageways terminating in a discharge orifice lying atop the exposed surface of the insert for ejecting high velocity coolant across the insert and beneath the chips formed from the workpiece. The discharge orifice of the tool holder is spaced within a critical range from the cutting edge of the insert clamped therein. The coolant is ejected from the discharge orifice at a velocity within a critical range and the tool holder is advanced in the cut at a feed rate within a critical range in practicing the method of this invention. Combination of discharge orifice spacing, coolant velocity and feed rate within the critical ranges results in improved chip control and tool life regardless of the type of material, depth of cut and speed of machining operations such as turning, boring, milling, threading, grooving and shaping.

12 Claims, 10 Drawing Figures

METHOD AND APPARATUS FOR MACHINING

RELATED APPLICATIONS

This application is a continuation-in-part of co-pending U.S. patent application Ser. No. 580,730, filed Feb. 23, 1984 and entitled "Method and Apparatus for Machining", now abandoned which is a continuation-in-part of U.S. patent application Ser. No. 470,193, entitled "Cutting Tool Assembly", filed Feb. 28, 1983, now abandoned, which is a continuation-in-part of U.S. patent application Ser. No. 263,305, entitled "Cutting Tool and Insert Therefor", filed May 13, 1981, now abandoned.

BACKGROUND OF THE INVENTION

This invention relates to machining and, more particularly, to an improved method and apparatus for performing metal working operations such as turning, boring, shaping, grooving, threading and milling.

A cutting tool generally includes a holder and one or more cutting inserts each having a surface terminating with one or more cutting edges. The holder is formed with a socket adapted to receive the cutting inserts which are clamped in a position so that in metal working operations such as turning, boring, shaping, milling, threading and grooving, the cutting edges of the inserts engage a workpiece and remove a chip of metal. The chips comprise a plurality of thin, generally rectangular shaped sections of metal which slide relative to one another along shear planes when separated from the workpiece. This shearing movement of the thin metal sections forming the chip generates a substantial amount of heat in addition to the heat generated by abrasion of the cutting edge of the insert as it contacts the workpiece.

Among the causes of failure of the cutting inserts of tool holders employed in prior art machining operations are abrasion between the cutting insert and workpiece, and a problem known as cratering. Cratering results from the intense heat developed in the formation of the chip, and the frictional engagement of the chip with the cutting insert.

As the metal forming the chip is sheared from the workpiece, it moves along the top surface of the insert and in some cases along the socket portion of the tool holder which secures the insert in place. Many inserts include a chip breaker groove on the surface which faces the chip for turning the chip upwardly away from the insert surface and the socket portion of the tool holder. However, even with chip breaker grooves, at least a portion of the upper surface of the insert inwardly from its cutting edge is in frictional engagement with the chip. Due to this frictional engagement, and the intense heat generated in the formation of the chip, craters are formed on the exposed, upper surface of the insert. Once these craters become deep enough, the entire insert is subject to cracking and failure along its cutting edge, and along the sides of the insert, due to abrasive contact with the workpiece. Cratering has become a particular problem in recent years due to the development and extensive use of alloy steels, super hard alloys such as titanium, stainless and nickel-based alloys.

Prior attempts to avoid cratering and abrasive wear of the insert have provided only modest increases in tool life and efficiency. One approach in the prior art has been to form inserts of high strength materials such as tungsten carbide. Although very hard, carbide inserts are brittle and can be easily chipped which results in premature failure.

To improve the lubricity and strength of inserts, such materials as hardened or alloyed ceramics have been used and a variety of low friction coatings have been developed for coating cutting inserts. Many inserts are currently manufactured with multiple coatings to further increase tool life. Although improved materials and coatings for cutting inserts have increased tool life to some degree, even the best cutting inserts must be replaced frequently, particularly in machining titanium and similar super alloy materials.

In addition to the improved materials and coatings used in the manufacture of cutting inserts, attempts have been made to increase tool life by reducing the temperature of the cutting insert and chip, and lubricating the cutting insert-workpiece interface. One method of cooling and lubricating has been to employ a quenching operation in which the tool holder and workpiece are flooded with a low pressure stream of any one of a number of types of coolant. Typically, a nozzle is disposed several inches above the cutting tool and workpiece which directs a low pressure stream of coolant onto the workpiece, tool holder and on top of the chips being produced. This technique, known as flood cooling, effectively cools only the upper surface of the chips, and that portion of the tool holder near the edge of the socket in which the cutting insert is mounted.

The underside of the chip which makes contact with the cutting insert, and the interface between the cutting insert and workpiece, are not cooled by a low pressure stream of coolant directed from above the tool holder. This is because the heat produced in the area of the chip and the cutting edge of the insert, particularly at the high operating speeds of modern milling machine tools or turning machines, vaporizes the coolant well before it can flow near the cutting edge of the insert.

In addition to the ineffectiveness of flood cooling, it can result in thermal failure of the cutting inserts. This occurs because a high temperature gradient is developed between the very hot area immediately surrounding the cutting edge of the insert, and the cooler inner portion of the insert mounted in the socket of the tool holder. The coolant cannot reach the cutting edge of the insert before it is vaporized and thus effectively cools only the area of the insert which is held in the tool holder. This extreme difference in temperature between the cutting edge and the remainder of the cutting insert can result in thermal failure.

One attempt to improve prior art flood cooling methods is found in U.S. Pat. No. 2,653,517 to Pigott. This patent teaches a method and apparatus for applying cooling liquids at a velocity of approximately 260 feet per second to a location between the workpiece and the back or rear edge of the insert beneath the top or exposed surface of the insert where the chip is produced. This general approach is also disclosed in German Pat. No. 3,004,166. The problem with such methods of cooling is that the coolant is not introduced at a location where cratering and high temperatures of the cutting insert occur; that is, between the exposed, top surface of the insert and the bottom surface of the chip produced. The introduction of coolant underneath the cutting insert does little or nothing to reduce the frictional engagement between the chip and cutting insert.

An alternative to the flood cooling methods described above is taught in U.S. Pat. No. 4,302,135 to Lillie. The rotary cutting tool disclosed in the Lillie patent comprises a body formed with a shank portion and a cutting portion through which a longitudinal bore extends including an inlet in the shank portion and an outlet in the cutting portion. Formed in the bottom surface of the cutting portion and extending radially outwardly from the outlet are spaced channels which terminate at sockets adapted to mount cutting inserts. The channels align with grooves formed in the cutting inserts which lead to the cutting edge of the inserts. Coolant is pumped through the central passageway, directed radially outwardly through the channels and is then radially deflected by the tool body along the coolant flow channels in the cutting inserts.

An attempt is made with the Lillie rotary tool to direct a high velocity, high pressure coolant flow to the area of the cutting insert-workpiece interface. But the structure provided in the Lillie patent does not permit the coolant to reach the cutting edge—workpiece interface, or the chips in that immediate area, due to the intense heat developed by the cutting operation. Flow of the coolant from the central passageway in Lillie to the cutting inserts is essentially unconfined or open to atmospheric pressure. Once the coolant is ejected from the outlet in the central passageway, its pressure and velocity drop by an order of magnitude. This is because the cross-sectional area of the base of the cutting portion of the Lillie tool is relatively large compared to that of the central bore, and the coolant flow is exposed to the atmosphere as each cutting insert rotates to the area already cut by the tool. With its pressure and velocity substantially reduced, the coolant stream provided in Lillie simply vaporizes before it can reach the immediate area of the cutting edge-workpiece interface where the intense heat is produced. The Lillie invention is thus essentially a flood cooling system in which any cooling achieved is confined to an area of the cutting insert immediately adjacent the end of the radial channels in the cutting portion of the body, and/or to the chips flowing outwardly from the cutting edge-workpiece interface when they reach that location.

In addition to limited tool life, another pervasive problem in the cutting tool industry involves the proper breakage and removal of chips from the area of the cutting insert and holder. Preferably, chips should be broken into short segments when sheared from the workpiece. If they are not broken but form in a continuous length, the chips tend to wrap around the cutting insert, tool holder and/or the workpiece which can lead to tool failure or at least require periodic interruption of the machining operation to clear the area of impacted or bundled chips.

Current attempts to solve the chip breaking and removal problem are limited to various designs of cutting inserts having a chip breaker groove, which is a groove formed in the top surface of the insert immediately adjacent the cutting edge. Chip breaker grooves engage the chips as they shear from the workpiece and turn or bend them upwardly from the surface of the insert so that they tend to fracture. While acceptable performance has been achieved with some chip breaker groove designs in some applications, variables in machining operations such as differing materials, types of machines, depths of cuts, feed rates and speeds make it virtually impossible for one chip breaker groove design to be effective in all applications. This is evidenced by the multitude of chip breaker designs now available which are intended to accommodate the widely varying machining conditions which can occur in industry. Selection of a suitable cutting insert for a particular application, if one exists at all, can be an expensive, difficult and continuous problem.

SUMMARY OF THE INVENTION

It is therefore among the objects of this invention to provide a method and apparatus for performing a machining operation such as cutting, boring, turning, milling, grooving, threading or drilling which fractures chips from the workpiece in relatively small lengths, which removes substantial amount of heat from the cutting insert-workpiece interface and the chips produced in the machining operation, which lubricates the cutting insert-workpiece interface and which prolongs the useful life of the cutting insert.

One presently preferred embodiment of an apparatus for practicing the method of this invention comprises a tool holder having one end formed with a seat in which a cutting insert is mounted having an exposed, top surface terminating with a cutting edge. The cutting edge of the insert is adapted to engage a rotating workpiece to form chips which overlie its top surface. A clamping member is mounted to the tool holder atop the exposed, top surface of the insert. The clamping member is formed with an internal, transition passageway having an enlarged entrance opening and a smaller discharge orifice which lies atop the exposed surface of the cutting insert within the seat. The discharge orifice may be either circular or noncircular in cross section. If circular, the discharge orifice is formed with a diameter preferably approximately equal to the depth of the cut taken by the cutting insert. A noncircular discharge orifice is preferably formed with a cross section having a smaller and larger transverse dimension, i.e., height and width. Preferably, the larger transverse dimension of the noncircular discharge orifice is approximately equal to the depth of cut taken by the cutting insert.

The apparatus of this invention functions to eject a high velocity jet of coolant between the top surface of the cutting insert and underside of the chip. In order to delivery the coolant thereat, one presently preferred embodiment of the apparatus of this invention includes means for conveying coolant to the tool holder and means for conveying the coolant through the tool holder for ejection from the discharge orifice. The coolant is conveyed to the tool holder by a delivery line connected at one end to the clamping member of the tool holder and at the other end to a pump having a rating of about 1,000–3,000 pounds per square inch. Preferably, the pump and delivery line are sized to convey the coolant to the tool holder at a velocity in the range of about 20 to 40 feet per second.

The coolant is conveyed within the clamping member by a connector passageway connected at one end with the delivery line, and communicating with the entrance opening of the internal, transition passageway. Preferably, the walls of the transition passageway taper from the connector passageway to the discharge orifice so that it is generally frusto-conical in shape. The angle formed by the walls of the transition passageway at the discharge orifice with respect to its longitudinal axis is preferably about 10 degrees. Assuming the discharge orifice is circular in cross section, the length of the transition passageway is preferably about 20 times the diameter of the discharge orifice. In addition, the walls of the transition passageway are highly polished in any one of a variety of known methods. The dimensions, frusto-conical shape and polished walls of the transition passageway accelerate the coolant between its entrance opening connected to the connector passageway and the discharge orifice to a velocity of at least 250 feet per second. Preferably, the coolant jet is released from the discharge orifice perpendicularly to the cutting edge of the insert plus or minus about 10°.

An alternative embodiment of the tool holder apparatus of this invention is provided in which the distance or spacing between the discharge orifice and cutting edge of the insert is adjustable. The tool holder includes a shank portion connected to a mounting block having cavity which forms a bottom surface, a rear wall, top wall and sidewall. The mounting block is formed with a seat at its bottom surface which is adapted to mount a cutting insert so that the top surface of the insert is flush with the bottom surface of the cavity. An orifice block mounts within the cavity which is formed with a connector passageway and an internal, transition passageway which are structurally and functionally equivalent to those of the tool holder embodiment described above. The orifice block is received within the cavity so that its discharge orifice lies atop the insert and ejects a coolant jet perpendicular to the cutting edge of the insert plus or minus about 10°. Coolant is delivered to the internal passageways of the orifice block through a primary coolant passageway formed in the shank portion of the holder which is connected to an external delivery line from a high pressure pump.

The tool holder of this embodiment includes means for adjusting the position of the orifice block along the bottom surface of the cavity in the mounting block so as to vary the distance between the discharge orifice and cutting edge of the insert. Such adjustment means includes a threaded stud which is movable into the cavity from the rear wall of the mounting block so as to engage the rearward end or face of the orifice block, opposite the discharge orifice, and laterally move the orifice block within the cavity. In addition, a screw or similar fastener is provided to mount the orifice block to the top wall of the mounting block when the orifice block is adjusted to the desired position.

Several variables are involved in all machining operations including the type of material, the rotational speed of the workpiece or tool holder, the feed rate, depth of cut, type of cutting insert, and other factors. In prior art machining operations, all of these variables had to be taken into account to successfully break or fracture chips from the workpiece in small lengths, and to prolong tool life so as to maximize the efficiency of the machining operation.

The method of machining according to this invention is predicated on the discovery that two other variables, in combination with feed rate, are critical in achieving both effective chip control and prolonged insert life. These previously unknown, critical variables include the spacing or distance between the discharge orifice of the tool holder and the cutting edge of the insert, and the velocity at which the coolant jet is ejected from the discharge orifice. It has been found that such variables must be maintained within specific ranges in order to successfully break chips and optimize the life of the insert.

In a presently preferred embodiment of the method of this invention, as practiced by either of the tool holder embodiments described above, the distance of the discharge orifice formed in the tool holder from the cutting edge of the insert clamped therein is preferably set within the range of approximately 0.040 inches to 0.440 inches. Once the discharge orifice is positioned relative to the cutting edge of the insert within that range, coolant is ejected from the discharge orifice across the exposed, top surface of the insert and beneath the chips formed from the workpiece at a velocity of at least 250 feet per second and preferably in the range of about 250–1,000 feet per second. The tool holder is then advanced axially along the longitudinal axis of the workpiece at a feed rate in the range of approximately 0.004 inches to 0.025 inches for each revolution of the workpiece or tool holder. The combination of discharge orifice spacing, feed rate and coolant velocity within the ranges and/or minimums given above has proven critical to the breakage of chips and optimization of tool life for a wide range of materials. A machining operation performed with tool holders such as described above within such critical operating parameters effectively breaks chips in small lengths, and optimizes insert life, regardless of the type of material machined or the speed and depth of cut at which the machining operation is performed.

Although specific combinations of feed rate, orifice spacing and coolant velocity within the ranges given above may differ from material to material, some combination of such variables within those ranges will result in effective chip control and prolonged tool life for essentially all materials. For example, in order to practice the method of this invention for a given material it is contemplated that a feed rate within the critical range would be chosen according to production requirements. The production manager would know how much material must be cut in any given day, and could set the feed rate accordingly. An orifice distance could then be chosen within the critical range given above, as, for example, a mid-range orifice distance of 0.200 inches. The operator would then enter the cut and vary the velocity of the coolant jet by adjusting the pump pressure, beginning with a velocity at least as high as 250 feet per second, until the chips are satisfactorily broken. In this fashion, it is contemplated that the desired chip breakage could be achieved regardless of the material type with a minimum amount of trial and error on the part of the operator.

Several factors are believed to contribute to the improved chip control and prolonged tool life obtained by the method and apparatus of this invention, as compared to prior art devices and methods. It is theorized that by ejecting a high velocity jet of coolant at a location directly beneath the chips being formed, and from a distance of between 0.040 inches and 0.440 inches from the cutting edge of the insert, the coolant jet can pierce the heat barrier produced by abrasion at the cutting insert-workpiece interface and by the shearing motion within the chips being formed. Due to the large surface area presented by the underside of the chips, and the extreme temperature differential of the chips and coolant, rapid heat transfer occurs between the chips and coolant. It is believed that the chip temperature is lowered so rapidly that its semi-plastic lattice structure is actually solidified in a disrupted molecular configuration. This results in the formation of very brittle chips which are much easier to break from the workpiece than chips having a normal lattice structure.

According to one theory, in the process of conducting the heat from the insert-workpiece interface, and the chips, a portion of the coolant becomes vaporized. Since the coolant jet is ejected across the exposed, top surface of the insert near its cutting edge, a substantial vapor pressure is developed by the vaporized coolant beneath the chip in addition to the pressure applied by new coolant continuously being ejected from the discharge orifice. The combined pressure of the vaporized coolant and line pressure builds beneath the chip which fractures the chips from the workpiece and removes them from the cutting area. In accordance with another theory, it is believed that the chips are broken simply by the force of the high velocity coolant jet.

It is also theorized that at least some of the coolant jet is not vaporized but flows at high velocity as a thin film along the upper surface of the insert and beneath the chip. This thin film of coolant is believed to perform two functions. First, at least some of the coolant film reaches the cutting edge-workpiece interface and flows between the microscopic interstitial surface irregularities of both the cutting edge and workpiece. This provides at least some lubrication and removes some of the heat produced thereat. Secondly, the thin coolant film on the upper surface of the cutting insert is believed to exert a hydrodynamic fluid force against the chips being formed which tends to urge them upwardly out of contact with the insert. This reduces abrasive wear of the insert and cratering formed by engagement of the chips with the insert so as to prolong its life.

The method and apparatus of this invention achieves a true coolant assisted machining operation in contrast to prior art flood cooling techniques. A high velocity coolant jet is ejected at a velocity of at least 250 feet per second from a discharge orifice, formed in a tool holder, which is positioned within a critical range of distances from the cutting edge of an insert clamped in the tool holder. The introduction of a high velocity coolant jet between the insert and chip, and immediately adjacent the cutting edge-workpiece interface, permits the coolant jet to pierce the vapor or heat barrier produced in the area of the cut so that effective cooling is provided at the cutting edge-workpiece interface and in the chips where extremely high heat is produced. Flood cooling systems are incapable of piercing this vapor barrier and therefore cannot achieve cooling of the chips which is required for effective chip control and prolonged tool life.

DESCRIPTION OF THE DRAWINGS

The structure, operation and advantages of a presently preferred embodiment of this invention will become further apparent upon consideration of the following description taken in conjunction with the accompanying drawings wherein.

DETAILED DESCRIPTION OF THE INVENTION

Referring now to the drawings, one presently preferred embodiment of a tool holder 10 is illustrated for machining a workpiece 12 in accordance with the method of this invention. The workpiece 12 is mounted in a chuck (not shown) which is adapted to rotate the workpiece 12 in the direction indicated in FIG. 1. Tool holder 10 is a turning holder for performing a turning operation, but it should be understood that the method of machining according to this invention is applicable to other machining operations such as milling, boring, cutting, grooving, threading and drilling, and the tool holder 10 is shown herein for purposes of illustration.

Figure 1:
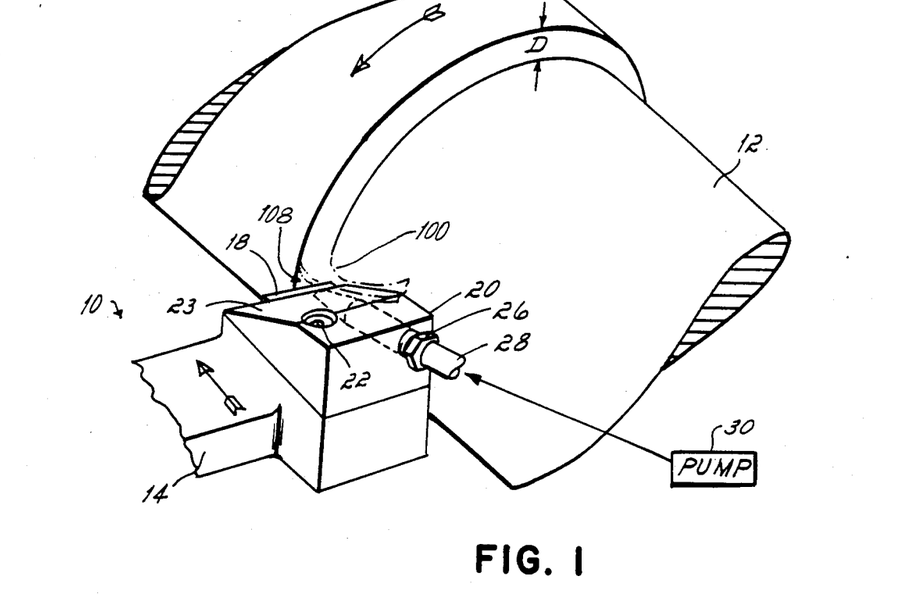
FIG. 1 is a partial isometric view, which is greatly exaggerated for purposes of illustration, showing one embodiment of a turning holder in accordance with this invention in the process of taking a cut on a cylindrical piece of stock.
Figure 2:
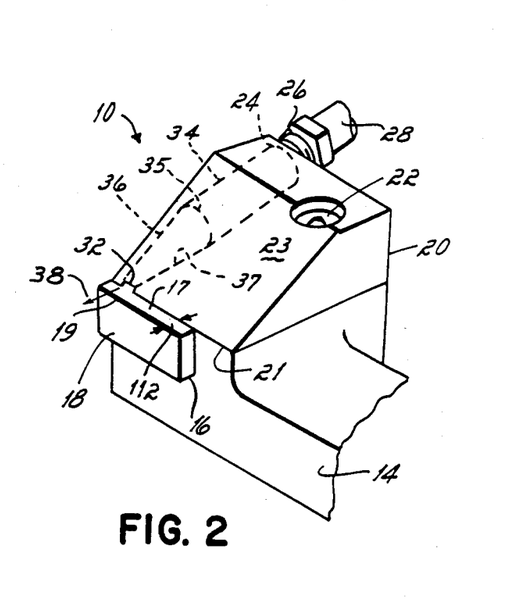
FIG. 2 is a partial isometric view of the turning holder shown in FIG. 1.

Tool holder 10 comprises a support bar 14 formed with a seat 16 adapted to receive a cutting insert 18 having an upper surface 17 terminating with a cutting edge 19. The cutting insert 18 is secured within the seat 16 by a clamp 20 which extends along the edge of the support bar 14 to a point spaced from the cutting edge 19 of insert 18. The clamp 20 is removably secured to the support bar 14 in a fixed position by a screw 22 which threads into a bore (not shown) formed in the top surface of the support bar 14.

A port 24 is formed in the end of clamp 20 opposite the cutting insert 18, which receives a fitting 26 connected to one end of a coolant delivery line 28. The opposite end of the coolant delivery line 28 connects to a high pressure pump 30 shown schematically in FIG. 1. Pumps 30 having a rating of 1,000 to 5,000, and preferably about 1,000 to 3,000 pounds per square inch are suitable. A discharge orifice 32 is formed in the leading end 21 of clamp 20 opposite the coolant delivery line 28. Although a single discharge orifice 32 is shown in the drawings, it is contemplated that two or more discharge orifices 32 may be formed in clamp 20 depending on the cut to be made. The discharge orifice 32 may be formed with a variety of cross sections including circular and rectangular. Preferably, the discharge orifice 32 is positioned at the leading end 21 of clamp 20 so that it is disposed approximately in the center of the depth of cut D at which the workpiece 12 is machined. See FIG. 1.

Coolant is conveyed through the clamp 20 from the coolant delivery line 28 to the discharge orifice 32 by internal passageways including a connector passageway 34 connected at one end by the fitting 26 to the coolant delivery line 28, and a transition passageway 36 which has an entrance opening 35 at the main passageway 34 and terminates with the discharge orifice 32. Preferably, the interior wall 37 of transition passageway 36 is highly polished by first buffing it with a diamond paste and then depositing a substance such as silica glass using a known vapor deposition process. The finish of the interior wall 37 of transition passageway 36 should preferably exhibit surface irregularities no larger than about 10 microns.

The pump 30, coolant delivery line 28, and passageways 34, 36 cooperate to eject a high velocity coolant jet from the discharge orifice 32 preferably at an efficiency of about 90%; that is, for a given flow rate and pressure, coolant is ejected from the discharge orifice 32 at an actual velocity within about 90% of the theoretical velocity. Preferably, the coolant delivery line 28 is sized according to the flow capacity of pump 30 to produce a coolant flow from the pump 30 to the port 24 in clamp 20 having a velocity of about 20 to 40 fps (feet per second). The flow rate is preferably between about 2 to 10 gallons per minute. It has been found that at this velocity and flow rate the coolant travels along the coolant delivery line 28 with minimum turbulence and insignificant losses due to drag. In one presently preferred embodiment of this invention, the diameter of the connector passageway 34 formed in clamp 20 is approximately equal to the diameter of the coolant delivery line 28 which ranges from about $\frac{1}{4}$ inch to $\frac{1}{2}$ inch in diameter. This ensures that the coolant will maintain a velocity of about 20–40 fps within the connector passageway 34 of the tool holder 10 to the entrance opening 35 of the transition passageway 36. Although it is not necessary to form the delivery line 28 or connector passageway 34 with circular cross sections, a circular cross section is preferred to simplify machining of the tool holder 10 and because of the availability of standard lines or hoses.

The coolant is accelerated within the transition passageway 36 from a velocity of 20–40 fps at its entrance opening 35, to form a coolant jet 38 which is ejected from the discharge orifice 32 at a velocity in the range of about 250 fps to 1,000 fps, depending on the pressure at which pump 30 is set. The discharge orifice 32 is formed in the clamp 20 so as to direct the coolant jet 38 perpendicularly to the cutting edge 19 of the insert 18, plus or minus about 10°.

Preferably, the transition passageway 36 is frusto-conical in shape so that its interior wall 37 tapers uniformly from its entrance opening 35 to the discharge orifice 32. The acute angle formed by the wall 37 of the transition passageway 36 at the discharge orifice 32 is preferably less than about 10 degrees relative to its longitudinal axis so as to produce a gradual taper along the length of transition passageway 36. This aids in the prevention of turbulence and losses as the coolant is accelerated to the discharge orifice 32. In order to ensure sufficient acceleration of the coolant, the transition passageway 36 is preferably formed with a length approximately equal to 20 times the diameter of the discharge orifice 32. If the discharge orifice 32 is not circular in cross section, its area is first calculated and the length of transition passageway 36 is then made to be approximately 20 times the diameter of a circular cross section having the same area.

Figures 3, 4:
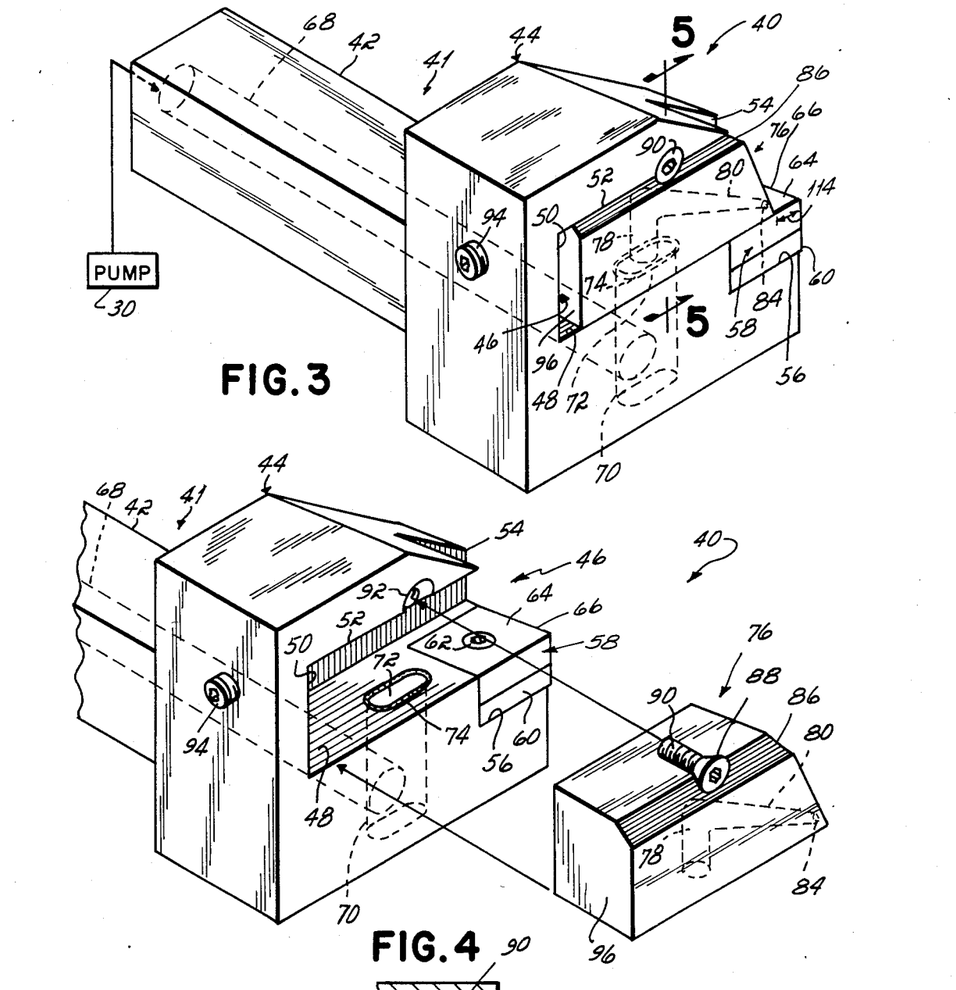
FIG. 3 is an assembled isometric view of an alternative embodiment of the turning holder of FIGS. 1 and 2.
FIG. 4 is an exploded isometric view of the embodiment shown in FIG. 3.
Figure 5:
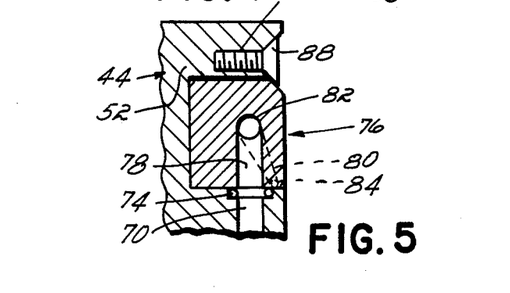
FIG. 5 is a cross sectional view taken generally along line 5—5 of FIG. 4.

An alternative embodiment of a tool holder 40 for practicing the method of this invention is illustrated in FIGS. 3-5. Tool holder 40 comprises a support bar 41 having a shank portion 42 connected to a mounting block 44. The mounting block 44 includes a cavity 46 which forms a bottom surface 48, a rear wall 50, and a top wall 52 spaced above and parallel to the bottom surface 48 and perpendicular to the rear wall 50, and a sidewall 54. The mounting block 44 is formed with a seat 56 in the bottom surface 48 for receiving a cutting insert 58 and spacer 60 which are mounted within the seat 56 by a set screw 62 so that the upper surface 64 of the insert 58 is flush with the bottom surface 40 and its cutting edge 66 extends outwardly from the mounting block 44.

A primary coolant passageway 68 is formed along the longitudinal axis of the shank portion 42 and extends into the mounting block 44. A vertical passageway 70 extends upwardly from the primary coolant passageway 68 to the bottom surface 48 of the cavity 46. As shown in FIG. 4, the vertical passageway 70 forms a generally oval shaped opening 72 at the bottom surface 48 of cavity 46 which receives an O-ring seal 74.

An adjustable clamp or orifice block 76 is slidably received within the cavity 46 atop its bottom surface 48. The orifice block 76 is formed with an internal connector passageway 78 which overlies the opening 72 of vertical passageway 70 with the orifice block 76 in place as shown in FIG. 3. An internal transition passageway 80 is also formed in the orifice block 76 which includes an entrance opening 82 formed at the connector passageway 78 and a discharge orifice 84 at the opposite end which lies atop the exposed, top surface 64 of the insert 58 for delivery of coolant thereacross. The bottom surface of the clamp or orifice block 76 resting atop the exposed surface 64 of the insert 58 also functions to aid in clamping the insert 58 within its seat 56.

The path for the delivery of coolant to a discharge orifice 84 lying atop the insert 58 is therefore provided along the shank portion 42, mounting block 44 and orifice block 76 of the tool holder 40 of this embodiment. Coolant flow from a pump 30 through exterior delivery line (not shown) enters the tool holder 40 at the primary coolant passageway 68. The coolant is directed from there to the vertical passageway 70, upwardly to the connector passageway 78 and then into the transition passageway 80 for ejection from the discharge orifice 84 as a jet (not shown) which is directed perpendicularly to the cutting edge 66 of insert 58, plus or minus about 10°. The transition passageway 80 of this embodiment is substantially identical in configuration and function to the transition passageway 36 described in the embodiment of FIGS. 1 and 2. Therefore, coolant is accelerated within the transition passageway 80 from a velocity of approximately 20 to 40 feet per second to a velocity at the discharge orifice 76 of from about 250 to 1,000 feet per second.

As described in more detail below, an important aspect of this invention is the space or distance between the discharge orifice 84 and the cutting edge 66 of insert 58. In order to vary the distance therebetween, the tool holder 40 shown in FIGS. 3-5 provide a means for varying the lateral position of the orifice block 76 along the bottom surface 48 of the cavity 46.

As best shown in FIGS. 4 and 5, an upper, outer edge 86 of the orifice block 76 is formed with a bevel of approximately 41° which corresponds to the angle of the tapered head 88 of machine screw 90. The orifice block 76 is clamped in place atop the bottom surface 48 of cavity 46 by threading the machine screw 90 into a recessed bore 92 formed in the top wall 52 of mounting block 44. In order to vary the position of discharge orifice 84 with respect to the cutting edge 66 of insert 58, a threaded stud 94 extends through the rearward wall 50 and engages the rearward face 96 of the orifice block 76. The threaded stud 94 is adjustable inwardly and outwardly within the rearward wall 50 to move the orifice block 76 laterally within cavity 46 and thereby vary the distance 114 between discharge orifice 84 and cutting edge 66 of insert 58 within a predetermined range. The opening 72 of vertical passageway 70 at the bottom surface 48 of cavity 46 is elongated so as to supply coolant into the connector passageway 73 of orifice block 76 throughout its range of lateral movement, while the O-ring 74 maintains a fluid-tight seal therebetween.

Figure 6:
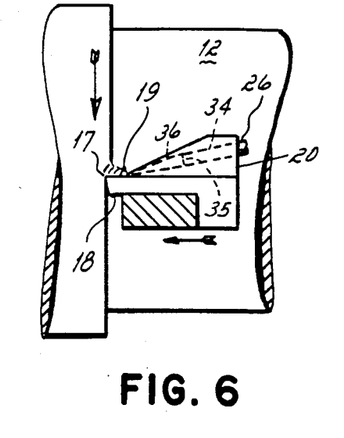
FIG. 6 is an enlarged side view of FIG. 1 in the area of the cut.
Figure 6A:
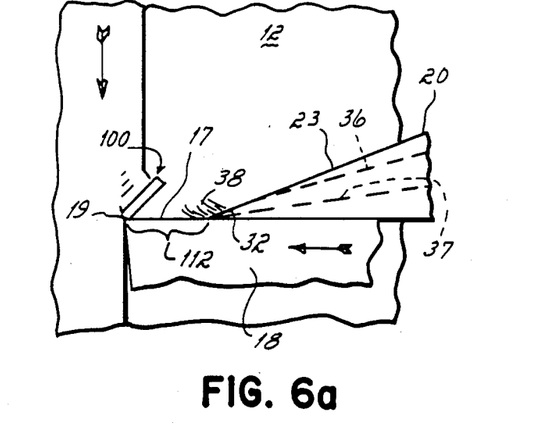
FIG. 6a is an enlarged side view of FIG. 1 at the beginning of a cut to form a chip.
Figure 6B:
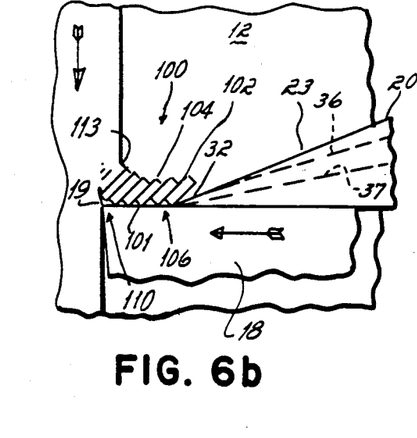
FIG. 6b is a side view as shown in FIG. 6a in which the chip being produced contacts the leading edge of the tool holder.
Figure 6C:
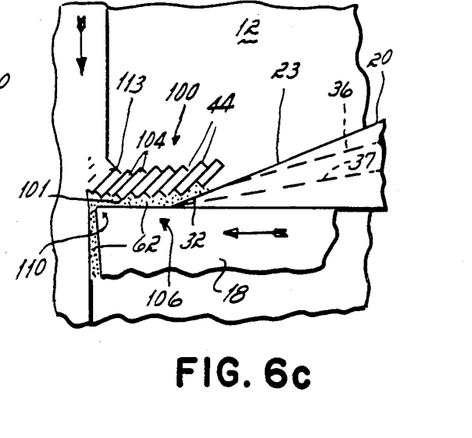
FIG. 6c is a side view as shown in FIG. 6a in which the chip being produced moves further along the upper surface of the tool holder.

Referring now to FIG. 6-6c, one theory is illustrated as to how a machining operation performed by the tool holder 10 according to the method of this invention proceeds. Although tool holder 10 is discussed herein and illustrated in FIGS. 6-6c, it should be understood that tool holder 40 functions in the same manner in performing a machining operation.

With the pump 30 operating and a coolant jet 38 being ejected from discharge orifice 32, the cutting edge 19 of insert 18 initially contacts the workpiece 12 and moves inwardly a predetermined depth D. The tool holder 10 is then advanced axially along the longitudinal axis of the workpiece 12 at a predetermined feed rate or axial distance for each revolution of the workpiece 12. The metal on the surface of workpiece 12 is sheared by the cutting edge 19 and a chip 100 begins to move along the upper surface 17 of insert 18 (see FIG. 6a). The chip 100 is formed by shearing the metal on the surface of the workpiece 12 along shear planes 102 to form individual thin sections 104 of metal which slide relative to one another along such shear planes 102. At this point in time, the chip 100 contacts the upper surface of insert 18 and the coolant jet 38 ejected from discharge orifice 32 strikes the front of chip 100, its top surface and the workpiece 12. This causes the chip 100 to start to curl away from the insert 18 before it reaches the angled surface 23 because of rapid contraction on the top surface of the chip 100 relative to its bottom surface 101.

The machining operation proceeds as shown in FIG. 6b. The chip 100 continues its advance along the upper surface 17 of cutting insert 18 and reaches the leading edge 21 of clamp 20. As best shown in FIG. 2, the leading edge 21 of clamp 20 is tapered and clamped directly on the surface 17 of insert 18. Once the chip 100 approaches the leading edge 21, it turns upwardly along the angled surface 23 of the clamp 20 and overlies the discharge orifice 32. It is believed that a portion of the coolant jet 38 from the discharge orifice 32 is deflected rearwardly by the chip 100 onto the clamp 20 so that the chip 100 never contacts the angled surface 23 but moves atop a thin film of coolant therealong.

An important aspect of this invention is that the chips 100 are sheared or broken off from the workpiece 12 in relatively small lengths, on the order of 2 inches or less, so as to avoid the formation of elongated chips (not shown) which can wrap around the tool holder 10 in bundles and disrupt the machining operation. One theory explaining the chip breaking capability of this invention is that with the chip 100 in engagement with the angled surface 23 of clamp 20, as in FIGS. 6b, 6c, a substantially sealed enclosure or cavity 106 is formed around the discharge orifice 32. Cavity 106 is formed by the workpiece 12, the angled surface 23 of clamp 20, the underside 101 of chip 100 and the upper surface 17 of insert 18. As viewed in FIGS. 6-6c, the workpiece 12 forms a wall opposite discharge orifice 32 and behind the chip 100, the top and bottom walls of the cavity 106 are formed by the underside 101 of chip 100 and the top surface 17 of insert 18, respectively, and the angled surface 23 of clamp 20 forms the wall of cavity 106 opposite the cut in the workpiece 12. The edge of chip 100 extending outwardly from the workpiece 12 forms an open area 108 in cavity 106 once the chip 100 contacts clamp 20, but such area is minimal in size. See FIG. 1.

In the initial phase of the cutting operation, shown in FIG. 6a, the pressure of the coolant jet 38 is substantially reduced immediately upon exit from the release orifice 32. This is because the coolant jet 38 is not confined within an enclosure but exposed to atmospheric pressure. At this stage, the coolant jet 38 flows primarily along the top of the chip 100. However, when the chip 100 advances to the leading end 21 of clamp 20 as shown in FIGS. 6b, 6c, it overlies the discharge orifice 32 and seals or encloses it within cavity 106. Although some loss of coolant velocity and pressure is created by the outwardly facing side of cavity 106, or open area 108, the coolant jet 38 ejected from the discharge orifice 32 is confined within a substantially sealed or closed cavity 106. The cavity 106, in effect, forms an extension of the closed transition passageway 36 within clamp 20 so as to maintain the velocity and pressure developed in the coolant jet 38 at a location beneath the chip 100 in the cutting area 110.

The chip 100 is fractured from workpiece 12 and removed by the high pressure developed within the cavity 106. A portion of the coolant jet 38 is vaporized by the heat developed in the cutting area 110. Since the cavity 106 provides a substantially sealed enclosure, high pressure is developed by the vaporized coolant jet 38 within the cavity 106 which is applied directly to the chip 100. In addition, pressure is exerted by the new coolant continuously exiting the release orifice 32 within the sealed cavity 106. The combined line pressure and vapor pressure of the coolant jet 38 is more than sufficient to snap or fracture the end 113 of chip 100 from the workpiece 12 and remove the entire chip 100 from the cutting area 110.

In most applications, fracture of the chip 100 is achieved as it moves between the positions shown at FIGS. 6b, 6c. As a result, relatively short chips 100 are produced and they are forced under pressure away from the cutting area 110. This feature of the invention provides an important advantage over existing machining systems in which chips are not typically fractured in small lengths but tend to form in long sections which wrap around the tool holder and cause problems of jamming.

An alternative theory explaining the chip breaking aspect of this invention is that the coolant jet 38 exiting the discharge orifice 32 at a velocity of between about 250 to 1,000 feet per second applies such a substantial force on the chip 100 that it simply snaps it from the workpiece 12 in short lengths. Although at least some pressure is created at the underside 101 of the chip 100, such pressure is not the critical factor in the breakage of chips 100 according to this theory. Rather, the impact force of the coolant jet 38 is thought to induce the chip breakage.

An important factor in the breakage of chips according to the method of this invention in both of the above theories, involves embrittlement of the chips 100 caused by the rapid removal of heat therefrom by the coolant jet 38. It is believed that due to the high velocity of the coolant jet 38, at least some coolant actually penetrates a short distance into the chips 100 along the shear planes 102 formed between the individual thin sections 104 of metal, and reduces the temperature thereat substantially in a short period of time. This rapid cooling of chip 100 causes the lattice structure to become semi-plastic, which then solidifies in a disrupted molecular configuration when cooled. Extremely rapid cooling of the chip 100 from a semi-plastic state causes embrittlement of the chip structure and substantially reduces its ductility and bending strength to facilitate breakage from the workpiece 12.

Regardless of the theories advanced to explain the chip breaking capability of the method and apparatus of this invention, it has been found that chip control and improved tool life are dependent on three critical variables of the machining operation. These variables include feed rate, orifice spacing and coolant velocity. Feed rate is a measure of the axial distance tool holder 10, or holder 40, advances along the longitudinal axis of the workpiece 12 for every revolution of the workpiece 12. If a milling holder were utilized in accordance with the method of this invention, for example, the feed rate would be expressed in terms of the axial movement of a rotating milling holder relative to a fixed workpiece. Orifice distance is defined herein as the space 112 between the discharge orifice 32 of holder 10 from the cutting edge 19 of the insert 16 clamped within holder 10, or the space 114 between the discharge orifice 84 of holder 40 from the cutting edge 66 of insert 58. The term coolant velocity is defined herein as the velocity of the coolant jet 38 in holder 10, or the jet (not shown) from holder 40, which is ejected from the discharge orifices 32, 84, respectively.

Figure 7:
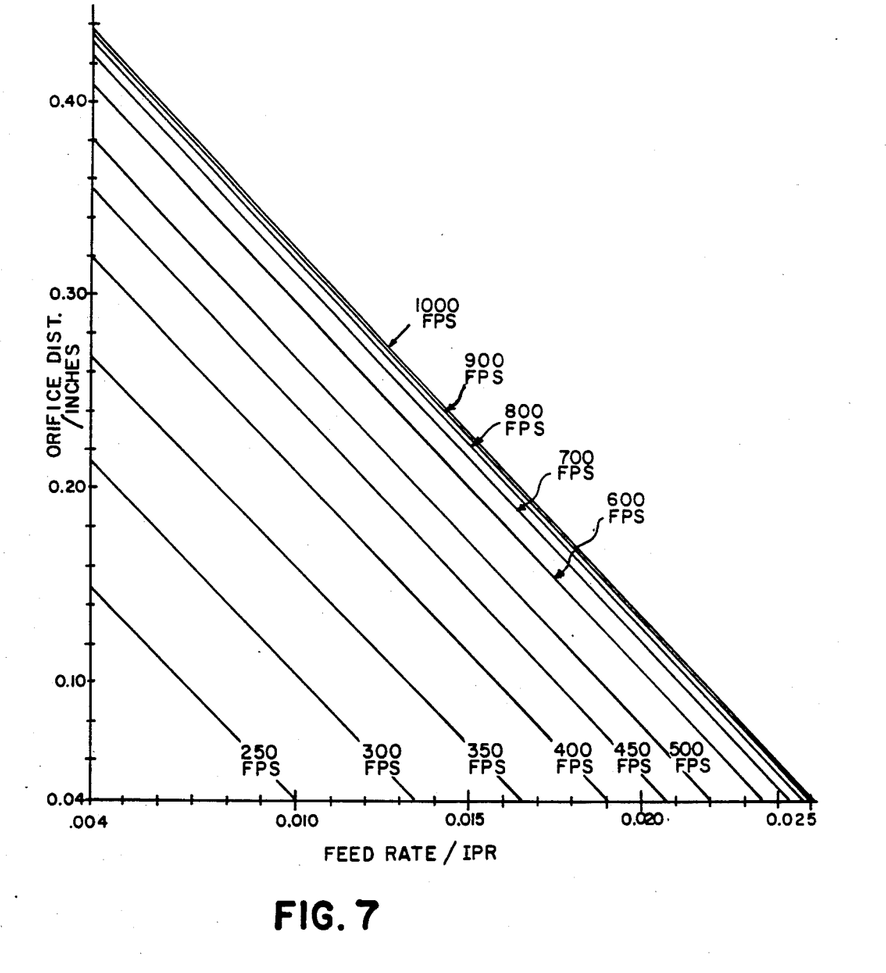
FIG. 7 is a graph of the critical operating parameters of the method and apparatus according to this invention.

Referring now to FIG. 7, a graphical representation is illustrated of the inter-relationship between feed rate, orifice distance and coolant velocity. Feed rate is shown on the abscissa of the graph with the units inches per revolution, and orifice distance is shown on the ordinate of the graph in inch units. Each diagonal line on the graph represents a separate coolant velocity from 250 feet per second to 1,000 feet per second. The curves on FIG. 7 were obtained from an experimental and theoretical analysis of the method of this invention utilizing a tool holder such as tool holder 10, and machining 1045 steel, 195 HB.

The graph of FIG. 7 illustrates combinations of orifice distance, feed rate and coolant velocity which will result in the breakage of chips 100 from a workpiece 12 regardless of the type of material forming the workpiece 12, the speed at which the workpiece 12 or tool holder are rotated or the depth of cut taken by the tool holder. As shown on the graph, the critical range of orifice distances is about 0.040 inch to 0.440 inch, the critical range of feed rates is about 0.004 to 0.025 inches per revolution and the coolant velocity must be at least 250 feet per second and preferably in the range of 250–1,000 feet per second.

The graph is interpreted as follows. Chips are broken from the workpiece 12 in small lengths by utilizing combinations of orifice distance and feed rate below the points on the graph where any given coolant velocity line intersects the ordinate and abscissa. For example, the line on the graph representing a coolant velocity of 400 feet per second intersects the ordinate of the graph at an orifice distance of 0.320 inches and intersects the abscissa of the graph at a feed rate of 0.018 inches per revolution. If the coolant velocity is set at 400 feet per second, chips will be broken from 1045 steel using a combination of orifice distance in the range of 0.040 to 0.320 inches and feed rate in the range of 0.004 to 0.018 inches per revolution. In other words, the entire area of the graph from the 400 feet per second coolant velocity line toward the origin of the graph represents orifice distance-feed rate combinations in which chips are broken at a 400 feet per second coolant velocity in accordance with the method of this invention.

It has been experimentally determined that the coolant velocity, orifice distance and feed rate ranges illustrated in FIG. 7 comprise the critical ranges of such parameters for achieving breakage of chips into small lengths and improved tool life. The tests which generated the particular graph shown in FIG. 7 were run on 1045 steel with a hardness of 195 HB. Although it is anticipated that curves generated for other materials would not be co-linear with those shown in FIG. 7, such curves would fall between the origin of the graph and the outermost curve represented by the coolant velocity of 1,000 feet per second. For example, tests have indicated that machining of a hardened material such as titanium would require lower settings of orifice distance and feed rate for a given velocity than the settings shown in FIG. 7 for 1045 steel. However, chips would be broken in the machining of titanium according to the method of this invention for settings within the ranges of orifice distance and feed rate shown in FIG. 7, for a given coolant velocity.

It is contemplated, therefore, that at least some adjustment of the orifice distance, feed rate and/or coolant velocity would be required on the part of the operator of a machine tool to practice the method of this invention. In a typical machining operation, it is anticipated that these adjustments would proceed as follows. Initially, the operator would set the feed rate of the machine tool in accordance with a daily manufacturing schedule. That is, the operator would know in advance how much material had to be machined on any given day and could calculate the feed rate required in order to finish the necessary amount of machining. The feed rate range of 0.004 to 0.025 inches per revolution, which is critical in the practice of this invention, is typical of the feed rates at which modern machine tools are operated.

The next step in machining according to the method of this invention is to set the orifice distance within the range of 0.040 inches to 0.440 inches. In the embodiment of the apparatus of this invention shown in FIGS. 1 and 2, the clamp 20 is mounted in a fixed position atop the support bar 14 of tool holder 10. The space 112 between the discharge orifice 32 of the clamp 20 and cutting edge 19 of the insert 16 is fixed at approximately the mid-range of the orifice distances shown in FIG. 7. For fixed clamps 20 of the type shown in tool holder 10, the orifice distance 112 could be changed by substituting another tool holder 10 with the clamp 20 fixed atop the support bar 14 in a different position. In the embodiment of the tool holder 40 shown in FIGS. 3–5, the orifice distance 114 is variable between 0.040 inches and 0.440 inches which corresponds to the range of orifice distances in FIG. 7. The tool holder 40 of FIGS. 3–5 thus provides the operator with more flexibility in setting up the tool holder for operation according to the method of this invention. In most instances, it is contemplated that an orifice distance in the mid-range of the ordinate on the graph in FIG. 7 would be acceptable, e.g., 0.250 inches.

At this point, the operator has set the machine tool at a feed rate in accordance with the production schedule of the day. He has also set the orifice distance of the tool holder 10 or tool holder 40 approximately in the mid-range of the graph of FIG. 7, or about 0.250 inches. The pump 30 is then activated so as to begin a coolant flow through the tool holder 10 or 40. The operator then enters the cut and simply adjusts the pressure of the pump 30 to obtain a velocity in the range of 250 to 1,000 feet per second at which chips are broken with the set combination of orifice distance and feed rate. For example, assuming the steel to be cut is 1045 steel having a 195 HB hardness, and the feed rate is set at 0.010 inches per revolution with an orifice distance of 0.125 inches, the pump pressure must be adjusted so that the coolant velocity is at least 350 feet per second in order to break chips. See FIG. 7. If the velocity is less than about 350 feet per second, chips will not be broken with such orifice distance and feed rate settings.

Feed rate, orifice distance and coolant velocity are therefore critical variables or parameters in obtaining improved chip control and tool life in accordance with the method and apparatus of this invention. Combinations of orifice distance in the range of 0.040 to 0.440 inches, feed rate in the range of 0.004 to 0.025 inches per revolution and coolant velocities in the range of 250 to 1,000 fps result in the breakage of chips in small lengths from a workpiece 12.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of machining a workpiece with an insert having a top surface terminating with a cutting edge, said insert being mounted within a holder formed with at least one discharge orifice oriented to direct coolant onto the top surface of said insert toward said cutting edge, comprising the steps of:

positioning the discharge orifice relative to the insert mounted in the holder so that the distance between the cutting edge of the insert and the discharge orifice is in the range of about 0.040 inch to 0.440 inch;

engaging the workpiece with the cutting edge of the insert and rotating the holder or the workpiece to form chips having a bottom surface overlying the top surface of the cutting insert;

ejecting a jet of coolant from the discharge orifice onto the top surface of the insert and beneath the bottom surface of the chip at a velocity of at least 250 feet per second;

moving the insert with respect to the workpiece at a feed rate in the range of about 0.004 to 0.025 inches per revolution of the holder or workpiece.

2. The method of claim 1 in which said step of ejecting a jet of coolant from the discharge orifice includes ejecting a jet of coolant at a velocity in the range of about 250 feet per second to 1,000 feet per second.

3. A method of breaking chips produced by the relative rotary engagement between the cutting edge at the top surface of an insert and a workpiece, the insert being mounted within a holder formed with at least one discharge orifice oriented to direct coolant onto the top surface of the insert toward the cutting edge, comprising the steps of:

positioning the discharge orifice relative to the insert mounted in the holder so that the distance between the cutting edge of the insert and the discharge orifice of the holder is in the range of about 0.040 inch to 0.440 inch;

ejecting a jet of coolant from the dicharge orifice onto the top surface of the insert and beneath a bottom surface of the chip overlying the top surface of the insert at a velocity of at least about 250 feet per second;

moving the insert with respect to the workpiece at a feed rate in the range of about 0.004 to 0.025 inches per revolution of the holder or workpiece.

4. A method of machining a workpiece with an insert having a top surface terminating with a cutting edge, said insert being mounted within a holder formed with at least one discharge orifice oriented to direct coolant onto the top surface of said insert toward said cutting edge, comprising the steps of:

positioning the discharge orifice relative to the insert mounted in the holder so that the distance between the cutting edge of the insert and the discharge orifice is in the range of about 0.040 inch to 0.440 inch;

engaging the workpiece with the cutting edge of the insert to form chips having a bottom surface overlying the top surface of the cutting insert;

rotating the holder or the workpiece;

ejecting a jet of coolant from the discharge orifice onto the top surface of the insert and beneath the bottom surface of the chip substantially perpendicularly to the cutting edge of the insert at a velocity of at least 250 feet per second;

moving the insert with respect to the workpiece at a feed rate in the range of about 0.004 to 0.025 inches per revolution of the holder or workpiece.

5. The method of claim 4 in which the step of ejecting a jet of coolant includes directing the jet of coolant at a 90° angle, plus or minus about 10°, relative to the cutting edge of the insert.

6. Apparatus for machining a workpiece with a cutting insert having a top surface terminating with a cutting edge, comprising:

a support bar formed with a cavity having a bottom wall, rear wall, top wall and side wall, said bottom wall being formed with a seat adapted to mount an insert with the top surface being exposed and the cutting edge projecting from said support bar;

an orifice block mounted on said bottom wall of said cavity in said support bar atop the cutting insert;

said orifice block being formed with an internal passageway, said internal passageway decreasing in cross section from an enlarged entrance opening to a discharge orifice lying on the top surface of the insert and being spaced from the cutting edge;

adjustment means mounted to said support bar for laterally adjusting the position of said orifice block along said bottom wall of said cavity atop the insert so as to vary the space between said discharge orifice and the cutting edge of the insert; and coolant delivery means for conveying coolant under high pressure and low velocity to said entrance opening, said coolant being accelerated within said internal passageway and ejected at high velocity from said discharge opening across the top surface of the cutting insert.

7. The apparatus of claim 6 in which said adjustment means comprises a threaded stud movable within a bore formed in said rear wall of said cavity, said threaded stud being adapted to extend into said cavity and engage said orifice block to position said discharge orifice along the top surface of the cutting insert.

8. The apparatus of claim 6 further including means for clamping said orifice block to said top wall of said cavity.

9. The apparatus of claim 6 in which said internal passageway has a longitudinal axis and is formed with a uniformly tapering wall from said entrance opening to said discharge orifice, the angle formed by said wall and said longitudinal axis at said discharge orifice being about 10°.

10. The apparatus of claim 6 in which said discharge orifice is circular in cross section, the length of said internal passageway between said discharge orifice and said entrance opening being about 20 times the diameter of said discharge orifice.

11. The apparatus of claim 6 in which said discharge orifice is non-circular in cross section, the length of said internal passageway between said discharge orifice and said entrance opening being about 20 times the diameter of an orifice of circular cross section having the same cross sectional area as said discharge orifice of non-circular cross section.

12. A method of breaking chips produced by the relative rotary engagement between the cutting edge at the top surface of the insert and a workpiece, said insert being mounted within a holder formed with at least one discharge orifice oriented to direct coolant onto the top surface of the insert toward the cutting edge, comprising:

positioning the discharge orifice relative to the insert mounted in the holder so that the distance between the cutting edge of the insert and the discharge orifice of the holder is in the range of about 0.040 inch to 0.440 inch;

moving the insert whth respect to the workpiece at a feed rate in the range of about 0.004 to 0.025 inches per revolution of the holder or workpiece;

ejecting a jet of coolant from the discharge orifice onto the top surface of the insert and beneath a bottom surface of the chip overlying the top surface of the insert at a velocity of about 250 feet per second;

increasing the velocity of the coolant jet from 250 feet per second until the chips are broken from the workpiece in small lengths up to a velocity of about 1,000 feet per second.

* * * * *